(12) United States Patent
Pini

(10) Patent No.: US 12,053,349 B1
(45) Date of Patent: Aug. 6, 2024

(54) DENTAL INSTRUMENT, METHOD OF MAKING AND USING THE SAME

(71) Applicant: Ryan Pini DDS PLLC, Colorado Springs, CO (US)

(72) Inventor: Ryan Pini, Colorado Springs, CO (US)

(*) Notice: Subject to any disclaimer, the term of this patent is extended or adjusted under 35 U.S.C. 154(b) by 474 days.

(21) Appl. No.: 16/991,598

(22) Filed: Aug. 12, 2020

Related U.S. Application Data

(60) Provisional application No. 62/885,619, filed on Aug. 12, 2019.

(51) Int. Cl.
    *A61C 8/00*     (2006.01)
    *A61C 19/02*     (2006.01)

(52) U.S. Cl.
    CPC ............ *A61C 8/0089* (2013.01); *A61C 19/02* (2013.01); *A61C 2202/00* (2013.01)

(58) Field of Classification Search
CPC ... A61C 8/0089; A61C 19/02; A61C 2202/00; A61C 8/00; A61C 19/00; A61C 3/00; A61C 8/02; A61F 2/28
USPC .................................................... 433/173, 49
See application file for complete search history.

(56) References Cited

U.S. PATENT DOCUMENTS

| | | | |
|---|---|---|---|
| 3,366,230 A * | 1/1968 | Loran .................... | A61C 19/02 206/63.5 |
| 6,997,709 B2 * | 2/2006 | Kangasniemi .......... | A61C 3/00 433/147 |
| 2002/0112981 A1 * | 8/2002 | Cooper .................. | A61B 90/94 206/570 |
| 2007/0031788 A1 * | 2/2007 | Chao ....................... | A61C 3/00 433/144 |
| 2014/0065572 A1 * | 3/2014 | Thai ........................ | A61C 3/00 433/147 |
| 2014/0113246 A1 * | 4/2014 | Jaramillo ................. | A61C 5/50 433/102 |

FOREIGN PATENT DOCUMENTS

WO      WO-2017173333 A2 *    10/2017      A61B 17/1673

* cited by examiner

*Primary Examiner* — Ralph A Lewis
*Assistant Examiner* — Mirayda A Aponte
(74) *Attorney, Agent, or Firm* — Messner Reeves LLP; Scott J. Hawranek

(57) ABSTRACT

A device and method of making the same, the dental instrument is configured as a peri-implant bone condenser instrument with an attached bone condenser device. There can be different configurations of handles, e.g., double sided or single sided, with many different attachment devices or attachment types that are permanently attached or releasably attached to the dental instrument.

14 Claims, 14 Drawing Sheets

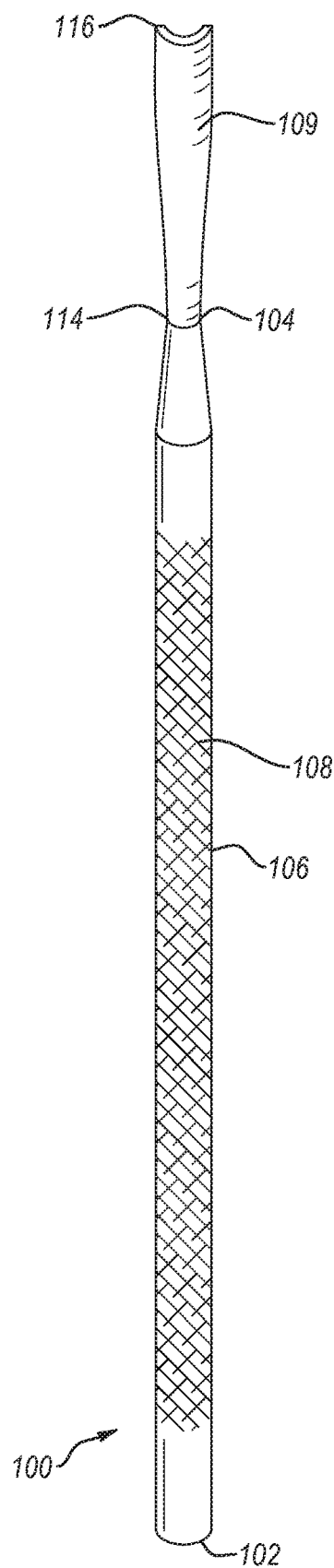
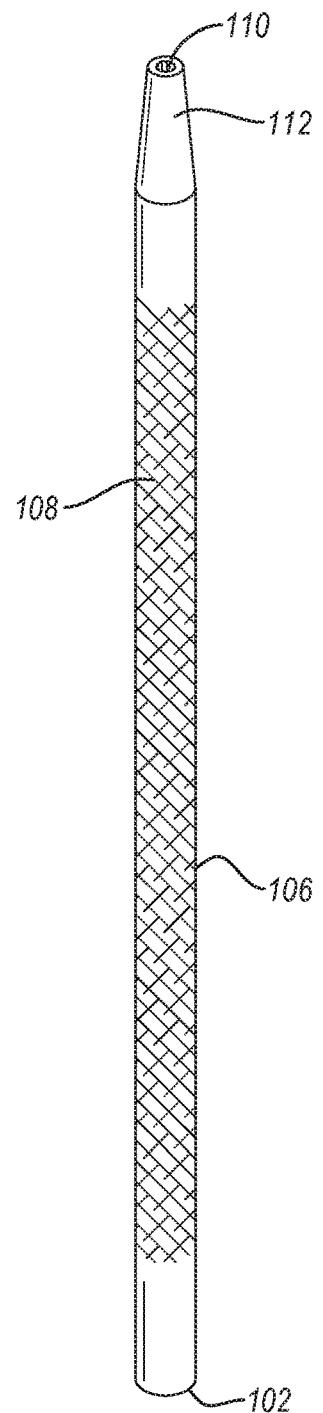
FIG. 1
FIG. 2

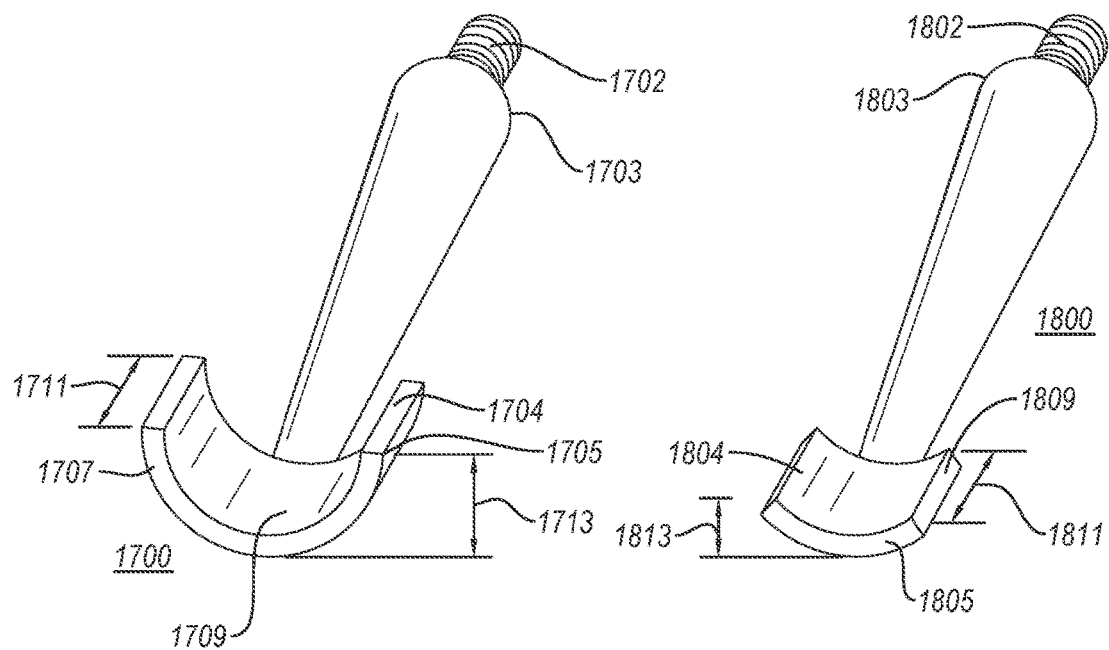
FIG. 17
FIG. 18
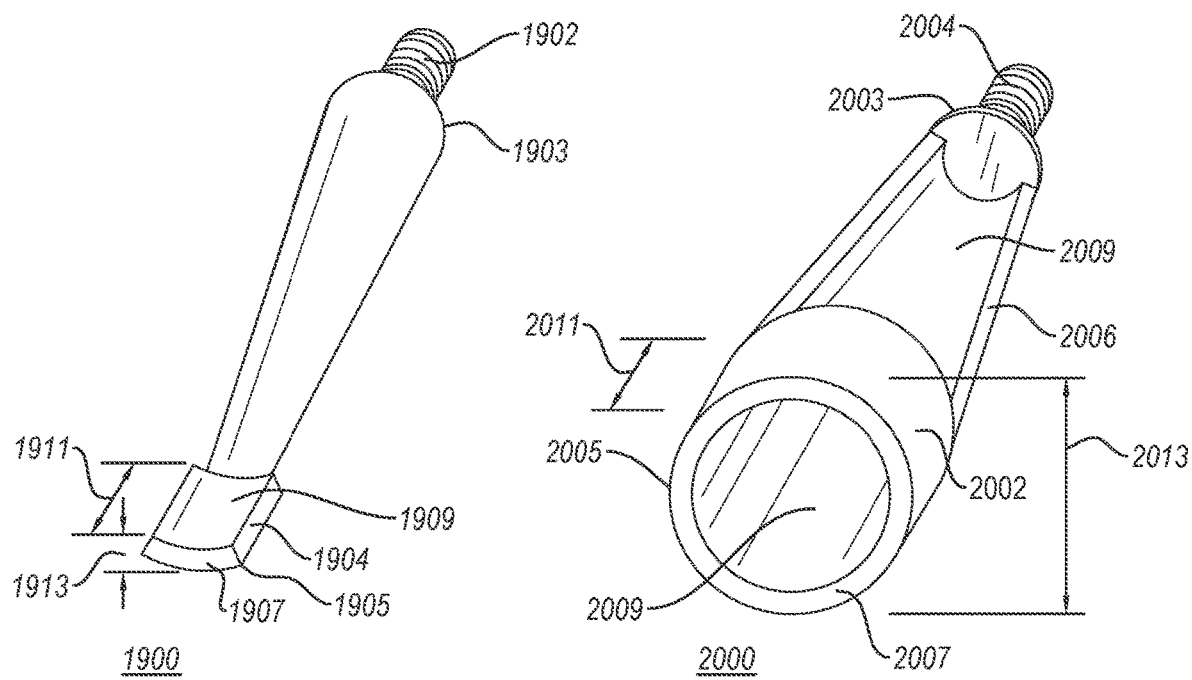
FIG. 19
FIG. 20

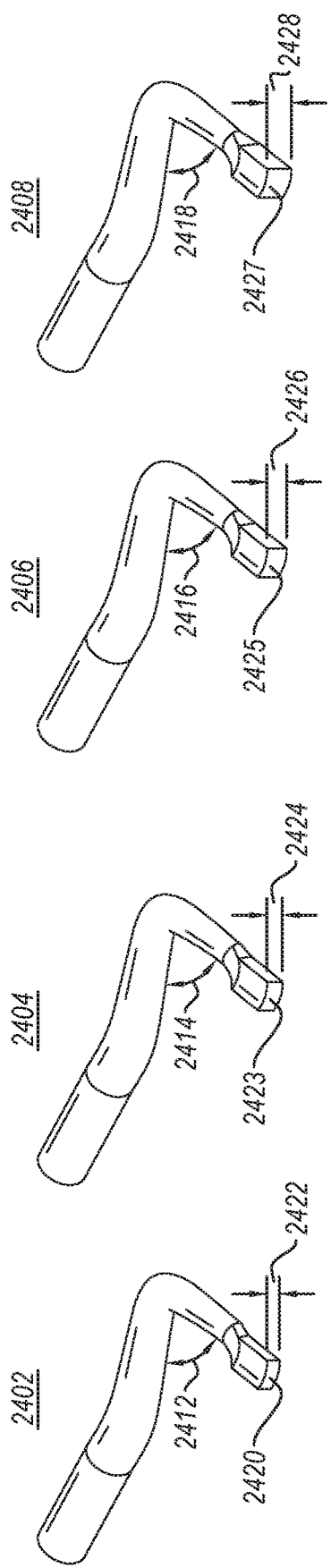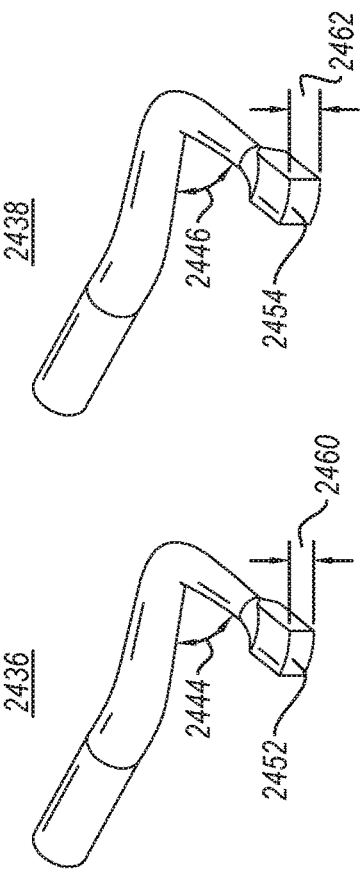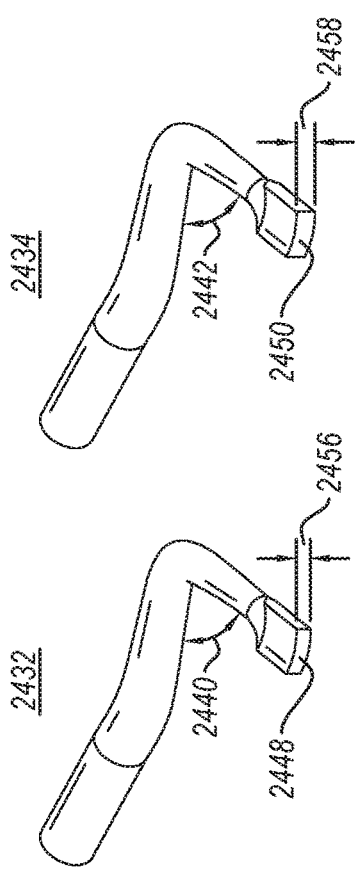

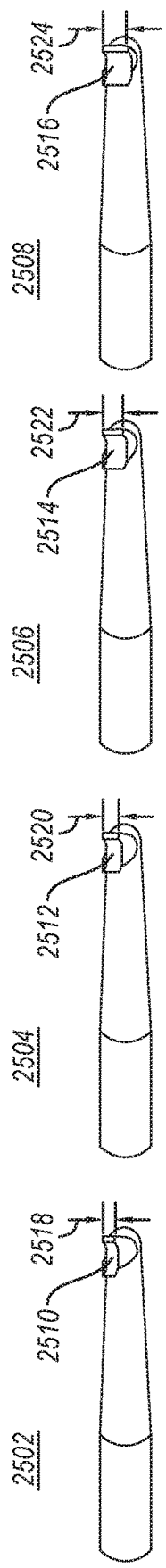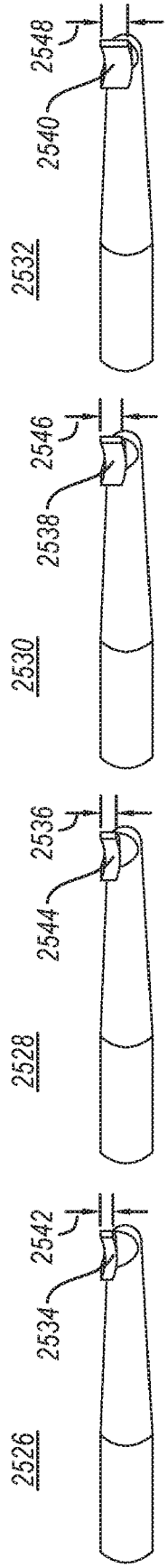

DENTAL INSTRUMENT, METHOD OF MAKING AND USING THE SAME

This application claims the benefit under 35 U.S.C. § 119(e) of U.S. Provisional Patent Application No. 62/885,619 filed Aug. 12, 2019, the above-identified application is also fully incorporated herein by reference.

BACKGROUND OF THE INVENTION

Field of the Invention

The invention generally relates to a dental instrument, method of making and using the same, and more particularly to a method and system for a sanitizer or duplicating media.

SUMMARY OF THE INVENTION

Accordingly, the invention is directed to a media sanitizer or duplicator that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of performing a dental procedure includes obtaining a dental instrument including a first end and a second end spaced apart from the first end, obtaining an attachment device comprising a first end, a second end, and a condensing area arranged between the first end and the second end having a shovel region for receiving bone graft material, wherein the second end has a condensing region having a thickness in a range from about 1 mm to about 3 mm. The method also includes obtaining a dental implant and arranging the dental implant at the treatment situs. The method further includes attaching the attachment device to the first end of the dental instrument and obtaining a predetermined amount of bone graft material on the shovel region of the attachment device. The method further includes arranging a desired amount of bone graft at the treatment situs around at least a portion of the implant. This method or any portion of this method may be repeated.

In another aspect of the present invention, a kit includes a plurality of different attachment devices each including a first end, a second end, an attachment mechanism, and a condensing area between the first end and the second end having a shovel region for receiving bone graft material. The second end has end thickness in a range from about 1 mm to about 3 mm. The dental instrument includes a first end, a second end spaced apart from the first end and an attachment mechanism for receiving the attachment mechanism of one of the attachment devices. The kit further includes instructions for use and optional case for each of the different attachment devices and dental instruments, which can include more than one.

In another aspect of the present invention, a dental device includes an attachment device including a first end, a second end spaced apart from the first end, a condensing area between the first end and the second end having a shovel region for receiving bone graft material. The second end has end thickness in a range from about 1 mm to about 3 mm. The dental instrument includes a first end, a second end, and an attachment mechanism in a lumen or channel of the first end that is configured to releasably engage the attachment mechanism of the attachment device.

This Summary section is neither intended to be, nor should be, construed as being representative of the full extent and scope of the present disclosure. Additional benefits, features and embodiments of the present disclosure are set forth in the attached figures and in the description hereinbelow, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 illustrates an exemplary perspective view of a dental instrument with an attached attachment device according to an embodiment of the invention.

FIG. 2 illustrates an exemplary perspective view of dental instrument of FIG. 1.

FIG. 17 illustrates an exemplary side view of a dental attachment according to an embodiment of the invention.

FIG. 18 illustrates an exemplary side view of a dental attachment according to an embodiment of the invention.

FIG. 19 illustrates an exemplary side view of a dental attachment according to an embodiment of the invention.

FIG. 20 illustrates an exemplary side view of a dental attachment according to an embodiment of the invention.

FIG. 24A illustrates an exemplary end view of a dental attachment according to an embodiment of the invention.

FIG. 24B illustrates an exemplary end view of a dental attachment according to an embodiment of the invention.

FIG. 24C illustrates an exemplary end view of a dental attachment according to an embodiment of the invention.

FIG. 24D illustrates an exemplary end view of a dental attachment according to an embodiment of the invention.

FIG. 24E illustrates an exemplary end view of a dental attachment according to an embodiment of the invention.

FIG. 24F illustrates an exemplary end view of a dental attachment according to an embodiment of the invention.

FIG. 24G illustrates an exemplary end view of a dental attachment according to an embodiment of the invention.

FIG. 24H illustrates an exemplary end view of a dental attachment according to an embodiment of the invention.

FIG. 25A illustrates an exemplary end view of a dental attachment according to an embodiment of the invention.

FIG. 25B illustrates an exemplary end view of a dental attachment according to an embodiment of the invention.

FIG. 25C illustrates an exemplary end view of a dental attachment according to an embodiment of the invention.

FIG. 25D illustrates an exemplary end view of a dental attachment according to an embodiment of the invention.

FIG. 25E illustrates an exemplary end view of a dental attachment according to an embodiment of the invention.

FIG. 25F illustrates an exemplary end view of a dental attachment according to an embodiment of the invention.

FIG. 25G illustrates an exemplary end view of a dental attachment according to an embodiment of the invention.

FIG. 25H illustrates an exemplary end view of a dental attachment according to an embodiment of the invention.

DETAILED DESCRIPTION OF THE ILLUSTRATED EMBODIMENTS

Figure 3:
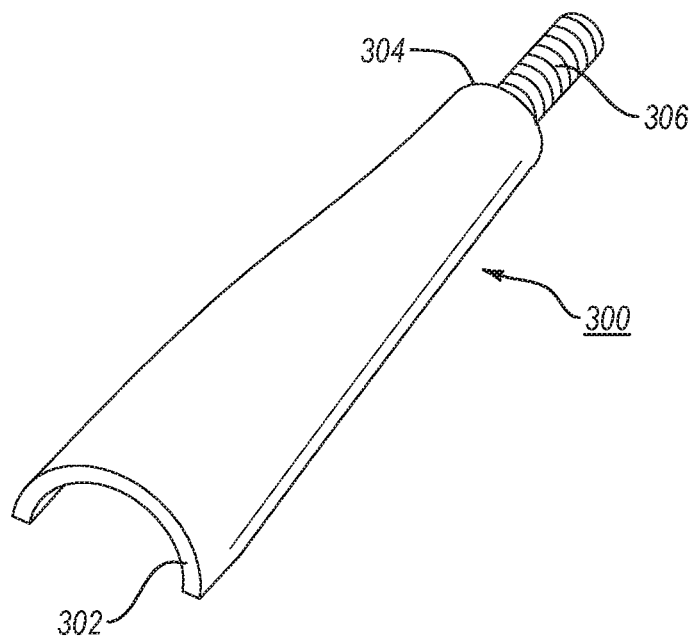
FIG. 3 illustrates an exemplary bottom perspective view of an attachment device according to an embodiment of the invention.

The following detailed description describes a dental instrument, method of using and making the same, as is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications, without departing from scope of the disclosure. The present disclosure is not intended to be limited to the described or illustrated implementations, but to be accorded the widest scope consistent with the described principles and features.

In one embodiment, the dental instrument is configured as a pen-implant bone condenser instrument with an attached bone condenser device. There can be different configurations of handles, e.g., double sided or single sided, with many different attachment devices or attachment types that are permanently attached or releasably attached to the dental instrument.

In one embodiment, when placing immediate placement dental implants into an extraction site an operator is required to place bone graft material around the implant in the air space between the implant and the natural alveolar bone. The problem is that there is not an instrument that is specifically designed for this purpose. Rather, the current instruments available to condense bone graft material around an implant are designed and used for other purposes and not for the purpose of carrying and condensing bone graft material efficiently around an implant. Adequately placing and condensing bone graft material helps increase the chances that the bone tissues will heal properly and with the best and most predictable outcome as possible. The operator faces a challenge of placing the bone graft material around the implant in such a manner that it adequately fills the air space between the implant and the natural alveolar bone. Embodiments of the invention are designed specifically to help the operator achieve adequate bone graft material placement in the air space in an efficient, safe and effective manner.

In one embodiment, a method of performing a dental procedure includes obtaining a dental instrument including a first end and a second end spaced apart from the first end, obtaining an attachment device comprising a first end, a second end, and a condensing area arranged between the first end and the second end having a shovel region for receiving bone graft material, wherein the second end has a condensing region having a thickness in a range from about 1 mm to about 3 mm. The method also includes obtaining a dental implant and arranging the dental implant at the treatment situs. The method further includes attaching the attachment device to the first end of the dental instrument and obtaining a predetermined amount of bone graft material on the shovel region of the attachment device. The method further includes arranging a desired amount of bone graft at the treatment situs around at least a portion of the implant. This method or any portion of this method may be repeated.

In one embodiment, a kit includes a plurality of different attachment devices each including a first end, a second end, an attachment mechanism, and a condensing area between the first end and the second end having a shovel region for receiving bone graft material. The second end has end thickness in a range from about 1 mm to about 3 mm. The dental instrument includes a first end, a second end spaced apart from the first end and an attachment mechanism for receiving the attachment mechanism of one of the attachment devices. The kit further includes instructions for use and optional case for each of the different attachment devices and dental instruments, which can include more than one.

In one embodiment, a dental attachment includes an attachment device including a first end, a second end spaced apart from the first end, a condensing area between the first end and the second end having a shovel region for receiving bone graft material. The second end has end thickness in a range from about 1 mm to about 3 mm. The dental attachment is configured to attach to a dental instrument having first end, a second end, and an attachment mechanism in a lumen or channel of the first end that is configured to releasably engage the attachment mechanism of the attachment device.

Reference will now be made in detail to an embodiment of the present invention, example of which is illustrated in the accompanying drawings.

FIG. 1 illustrates an exemplary perspective view of a dental instrument with an attached dental tool according to an embodiment of the invention. FIG. 2 illustrates an exemplary perspective view of dental instrument handle of FIG. 1.

Referring to FIGS. 1-2, the dental instrument is generally represented with reference to number 100 including a first end 102, an opposite spaced apart second end 104, and a handle 106. The handle 106 includes a textured region 108 that provides for enhanced safety by preventing or substantially preventing slipping or movement of a user's hand during use of the dental instrument 100. The second end 104 has an open end 110 and the first end 102 is a closed end. The textured region 108 is arranged between the first end 102 and the second end 104. Optionally and/or alternatively, the second end 104 has a region 112 with a tapered configuration.

The dental instrument 100 can have a diameter or width in a range from about 1 mm to about 10 mm and any sub-range there between or greater. The dental instrument 100 can have a length in a range from about 5 cm to about 16 cm, any sub-range therein or greater.

The textured region 108 can include any type of texture, e.g., texture arranged directly into the surface of the textured region 108, a separate layer on the surface of the handle 106, a coating on the handle 106 where the coating has a texture or any combination of the same. The texture in the texture region 108 can include any geometry pattern of texture, e.g., circle pattern, square pattern, triangle pattern, diamond pattern, honeycomb pattern, crisscross pattern, linear pattern, non-linear pattern, combinations of the same or the like. The texture can be at a depth of about 0.01 mm to about 1 mm or greater. Optionally and/or alternatively, the textured region 108 can include an anti-slip coating, anti-slip tape or combinations of the same. Optionally and/or alternatively, the textured region 108 or dental instrument can include an anti-bacterial coating, anti-fungal coating or the like. Optionally and/or alternatively, the instrument can be any color or combination of colors.

An opening 110 has an attachment mechanism (not shown) configured as channel or lumen 110. The channel or lumen 110 extends from the second end 104 into the taper region 112 to a predetermined depth, e.g., in a range from about 1 mm to about 10 mm or greater. The attachment mechanism (not shown) in the open end 110 can include a female attachment mechanism, e.g., one or more of threads, push-snap system, and the like, that is configured to releasably engage an attachment mechanism (not shown) on attachment devices 109, the attachment mechanism (not shown) on the attachment device can be a male attachment mechanism, e.g., threads, push, snap system and the like, that is configured to releasably attach to the attachment devices 109 to the dental instrument 100. Optionally and/or alternatively, the attachment mechanism on the handle may include male attachment mechanism and the attachment mechanism on the attachment device may include a female attachment mechanism.

In this embodiment, the attachment device 109 is releasably attached to the dental instrument 100. Optionally and/or alternatively, the attachment device 109 is integral with the dental instrument 100 as one-piece that cannot be releasably attached, but is rather permanently attached. The dental instrument 100 and attachment device 109 can be constructed from surgical stainless steel or any other material described herein. The handle width can be in a range from about 2 mm to about 12 mm wide or greater and be in a range from about 9 cm to about 16 cm or greater.

The tapered connection section 112 allows for ease of use of instrument by decreasing circumference for better clearance in areas of use. Taper section 112 can vary in length in a range from about 10 mm to about 30 mm. The degree of taper can also vary from about 5 degrees to about 40 degrees. The diameter of the insertion end of the taper region 112 can be in a range from between about 3 mm to about 8 mm.

In this embodiment, the attachment device 109 is configured as a pen-implant bone condenser. The material of the attachment device 109 is one of titanium, plastic, thermoplastic, metal, alloy, or any combination or other acceptable material. The length can vary from the first end 114 to the second end 116, e.g., from about 3 mm to about 5 cm or greater. The attachment device 109 is tapered from the connection area at or near the first end 114 starting with a width in a range from about 3 mm to about 8 mm or greater as it approaches the second end 116 or the condensing end region of the attachment. The degree of angle, width and length of condensing end varies depending on the size and configuration.

In this embodiment, the opening 110 includes a female insertion end with having threads inside as an attachment mechanism. It allows for the male attachment mechanism of the attachment device 109 to screw into the opening 110 and be releasably attached to the handle 106 or dental instrument 100. The thread type, width and depth are configured to prevent or substantially prevent the attachment device 109 from being stripped out during application of force or use of the instrument.

Figure 4:
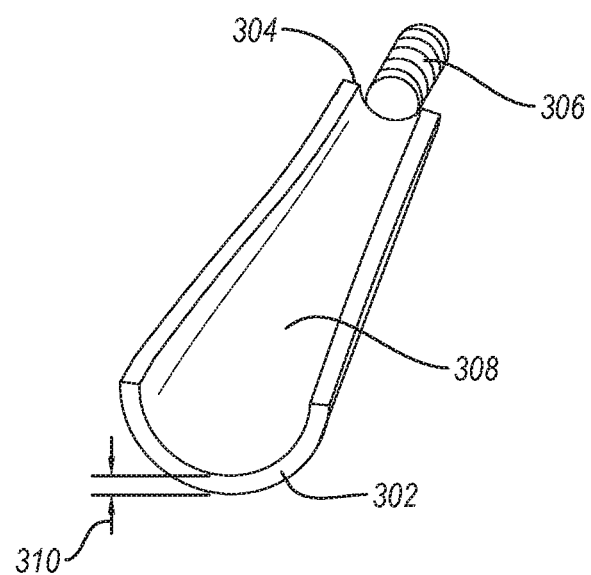
FIG. 4 illustrates an exemplary top perspective view the attachment device according to FIG. 3.
Figure 5:
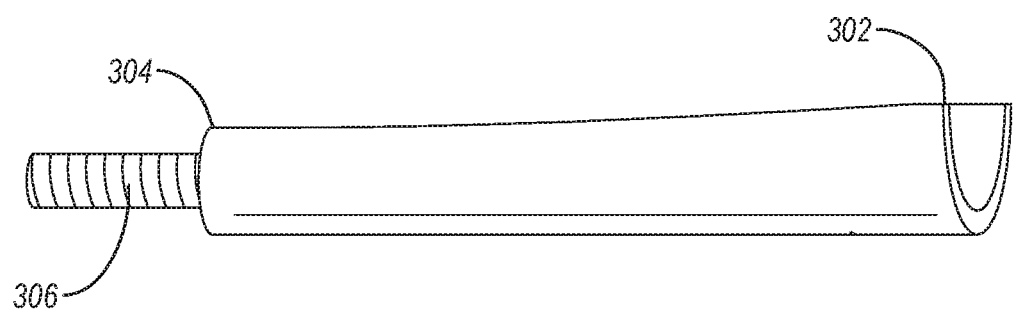
FIG. 5 illustrates an exemplary side perspective view of the attachment device according to FIG. 3.
Figure 6:
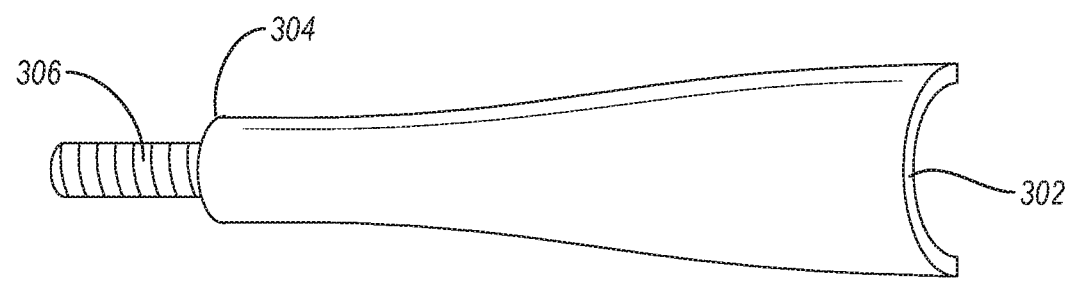
FIG. 6 illustrates an exemplary bottom perspective view of the attachment device according to FIG. 3.

FIG. 3 illustrates an exemplary bottom perspective view of an attachment device according to an embodiment of the invention. FIG. 4 illustrates an exemplary top perspective view of an attachment device according to FIG. 3. FIG. 5 illustrates an exemplary side perspective view of an attachment device according to FIG. 3.

Referring to FIGS. 3-5, an attachment device 300 is a representation of a possible configuration of a pen-implant bone condenser attachment 300. It is fabricated using a material described herein. The peri-implant bone condenser attachment 300 includes a first end 302 and a second end 304. The second end 304 includes a male attachment mechanism 306. The attachment mechanism 306 can include any attachment means or mechanism as described herein, e.g., threads, snap fittings, and the like. The first end 302 is configured as a peri-implant bone condenser having a width 310 in a range from about 1 mm to about 3 mm. The width 310 of the condensing end 302 can also taper from middle to ends and going from wider in the middle of the condenser and thinning as it goes to the ends of the condenser. The length from the first end 302 to the second end 304 can be a in a range from about 3 mm to about 4 cm or greater.

Bone graft condensing area 308 can be used for carrying the bone graft from the bone graft container in the workspace in the operatory to the area in the mouth where the implant that has been placed. The condensing area 308 is configured to have a curvature diameter of the implant to adequately clear the implant during the condensing procedure. The bone graft carrier area 308 transitions into the connection end 306 of the bone condenser which is inserted and screwed into the handle of the instrument. It has a smooth transition from a spoon area to the attachment area.

Figure 7A:
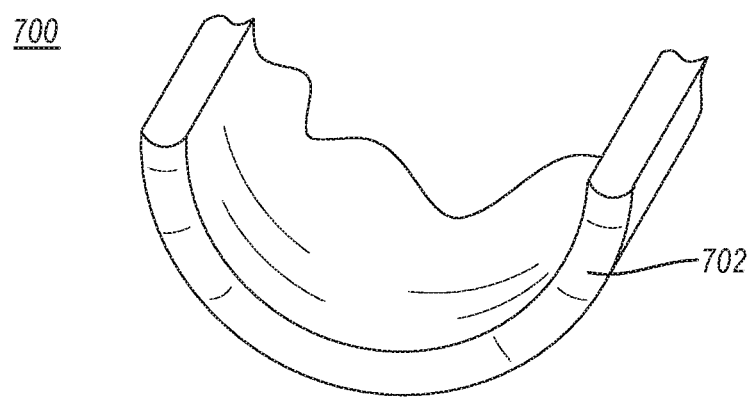
FIG. 7A illustrates an exemplary end view of a dental tool according to an embodiment of the invention.
Figure 7B:
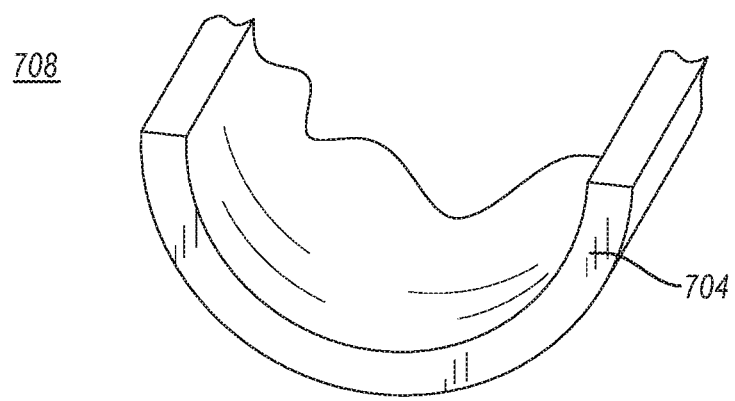
FIG. 7B illustrates an exemplary end view of a dental tool according to an embodiment of the invention.
Figure 7C:
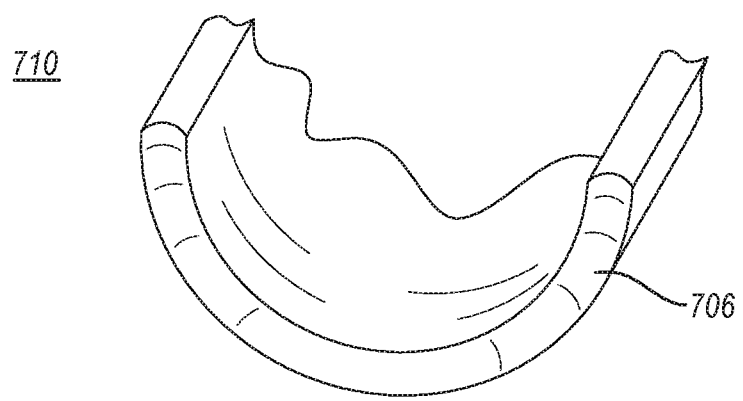
FIG. 7C illustrates an exemplary end view of a dental tool according to an embodiment of the invention.

FIG. 7A illustrates an exemplary end view of an attachment device according to an embodiment of the invention. FIG. 7B illustrates an exemplary end view of a dental attachment device according to an embodiment of the invention. FIG. 7C illustrates an exemplary end view of an attachment device according to an embodiment of the invention.

Referring to FIGS. 7A, the attachment device 700 is a peri-implant bone condenser as described herein. In this embodiment, the condensing end 702 has a convex type rounded configuration on its end. The convex is a smooth transition from the side of the instrument to the condensing end that removes a sharp square angle.

Referring to FIG. 7B, the attachment device 708 is a peri-implant bone condenser as described herein. In this embodiment, the condensing end 704 a flat or square geometry. There is a about a ninety (90) degrees angle where the side and the condenser end meet.

Referring to FIG. 7C, the attachment device 710 is a peri-implant bone condenser as described herein. Except in this configuration the condensing end 706 has a concave end of the bone graft condenser. This concave area can be from a depth in range from about of 0.2 mm to about 2 mm in a semi-circular shape. The outer edge of the condensing surface can extend further than the inner edge to facilitate bone graft condensing.

Figure 8:
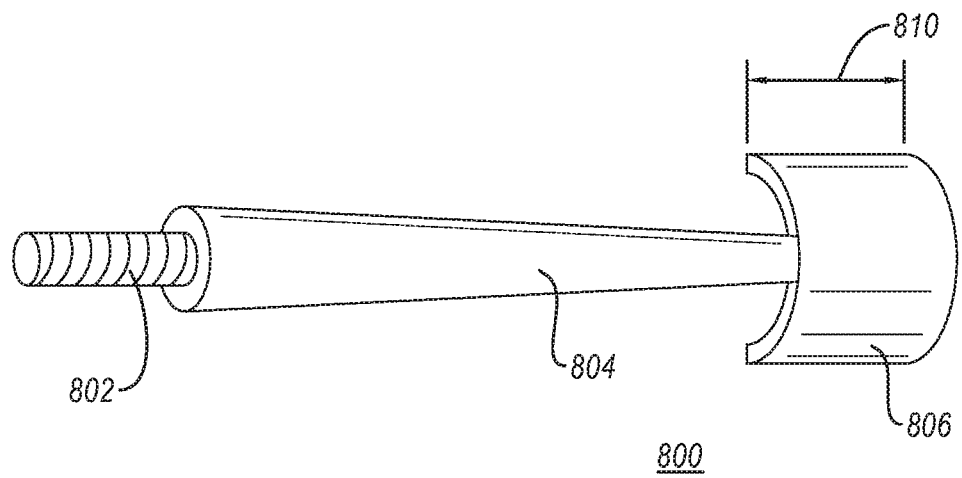
FIG. 8 illustrates an exemplary bottom view in a first orientation of a dental tool according to an embodiment of the invention.
Figure 9:
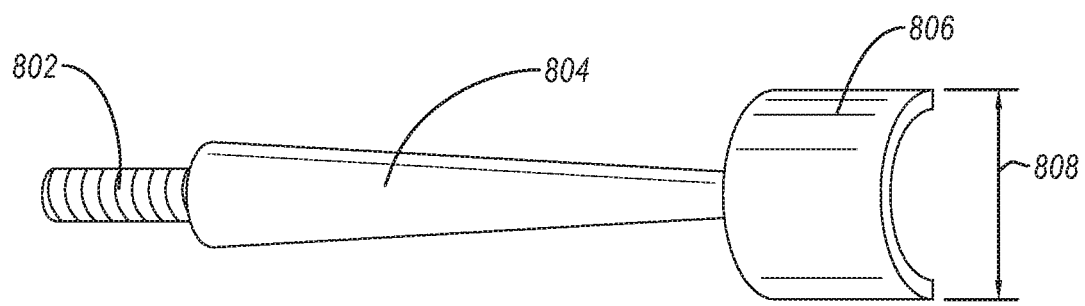
FIG. 9 illustrates an exemplary bottom view in a second orientation of a dental tool according to FIG. 8.
Figure 10:
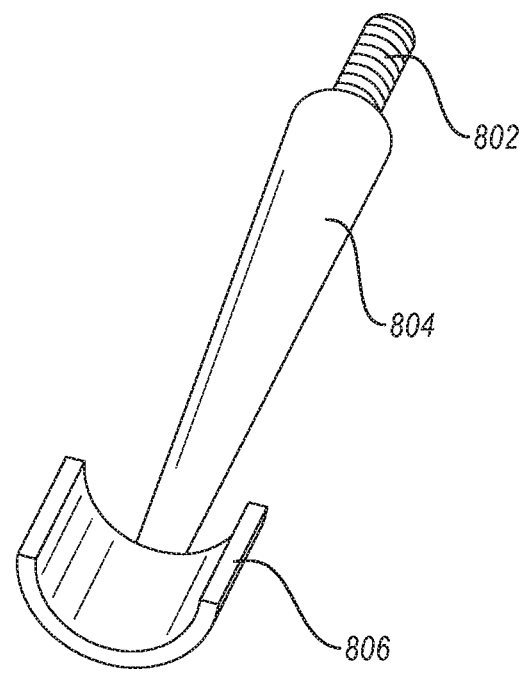
FIG. 10 illustrates an exemplary top view in a first orientation of a dental tool according to FIG. 9.
Figure 11:
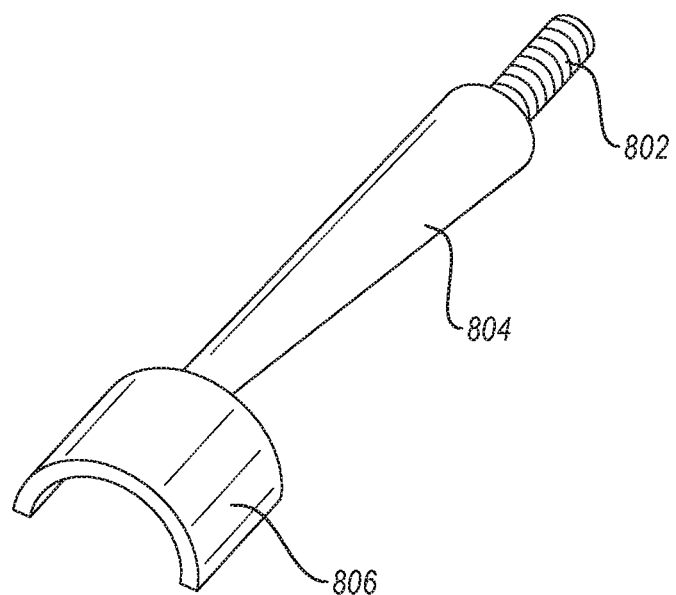
FIG. 11 illustrates an exemplary bottom view in a first orientation of a dental tool according to FIG. 9.

FIG. 8 illustrates an exemplary bottom view in a first orientation of a dental tool according to an embodiment of the invention. FIG. 9 illustrates an exemplary bottom view in a second orientation of a dental tool according to FIG. 8. FIG. 10 illustrates an exemplary top view in a first orientation of a dental tool according to FIG. 9. FIG. 11 illustrates an exemplary bottom view in a first orientation of a dental tool according to FIG. 9.

In FIG. 8-11, the dental instrument 800 is a peri-implant bone graft condenser. The dental instrument 800 it is made of titanium, thermoplastic, or other material described herein. It has a threaded male attachment mechanism 802 with a tapered neck 804 with a bone graft carrier and condenser 806 on the end. This figure demonstrates a different shape and design of the bone graft condenser attachment. This design is not a full-length spoon area as shown in FIG. 5. This configuration has a narrower rounded neck that allows for and is configured for better visualization of the working area.

In FIG. 8, the attachment mechanism 802 includes a male threaded end it is as wide as the tapered end of the handle so that there is a smooth transition from the handle to the attachment. The taper will continue to taper until it meets the bone graft carrier portion of the instrument. The degree of taper can be in a range from 3 degrees to 25 degrees or any degree therebetween.

The condenser 806 has a diameter of curvature in a range from about 2 mm to about 8 mm or greater dependent on the size of implant used. The width 808 of the condenser can be from 0.2 mm to about 5 mm or greater. The width can also vary from wider in the middle and become smaller as it approaches the end of the condenser. The length 810 of the condenser can be from about 3 mm to about 15 mm or greater. The height 811 can be in a range from about 3 mm to about 10 mm or greater. The condensing end of the instrument does not have to be of a flat semi-circle configuration.

Figure 12:
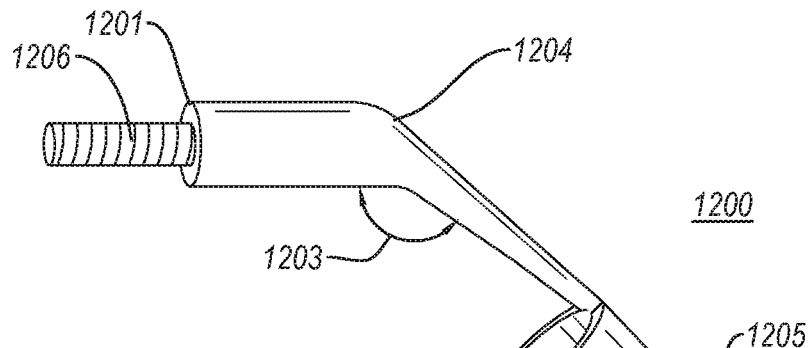
FIG. 12 illustrates an exemplary side view of a dental attachment according to an embodiment of the invention.

FIG. 12 illustrates an exemplary side view of a dental attachment according to an embodiment of the invention.

Referring to FIG. 12, the dental attachment 1200 illustrates a possible configuration of the bone graft condensing attachment. The dental tool 1200 includes a first end 1201, a second end 1205 and an attachment mechanism 1206. The second end 1205 includes a bone graft condenser head 1202. This configuration demonstrates an angle 1203 at a location 1204 in the neck region that is located at a distance in a range from of about 3 mm to about 25 mm from the first end 1201.

Different angles 1203 can be used and different bone graft condensing angles and orientations can be used. For example, the angle 1203 of the neck can vary in a range from about 30 degrees to about 65 degrees. The diameter of the male attachment end 1206 can be the same as the female attachment on the handle, e.g., a diameter in a range from about 3 mm to about 8 mm. The diameter can slightly decrease and taper toward the bone graft condensing end. The diameter of the bone grant condensing end 1205 can be in a range from about 2 mm to about 5 mm or greater. The degree of taper can be in a range from 2 degrees to 25 degrees.

The bone graft condenser head 1202 can attached to the neck at the same angle 1203 as neck or a different angle (not shown). The angle of the head can change and does not have to follow the same angle as the neck. The head does not have to attach to the neck in the middle of the condenser. It can also attach at the end of the condenser. The condenser head 1202 can also be rotated (turned) to the left or to the right. With an angled neck the rotated condenser head allows for different angles of condensing around the implant. The curvature diameter can vary in a range from about 2 mm to about 8 mm. The height, width, and length of the condenser head 1202 can be any height, width and length as described herein.

Figure 13:
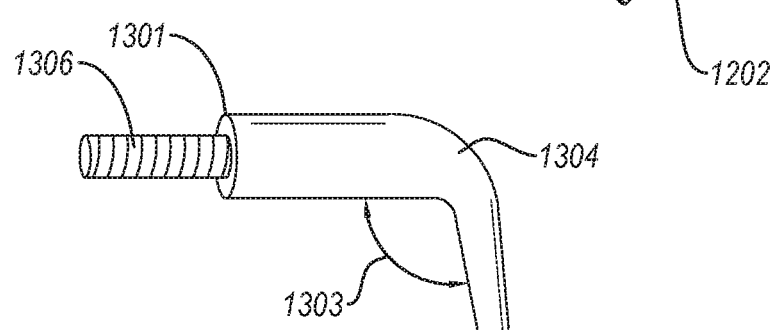
FIG. 13 illustrates an exemplary side view of a dental attachment according to an embodiment of the invention.

FIG. 13 illustrates an exemplary side view of a dental attachment according to an embodiment of the invention.

Referring to FIG. 13, the dental attachment 1300 illustrates a possible configuration of the bone graft condensing attachment. The dental tool 1300 includes a first end 1301, a second end 1305 and an attachment mechanism 1306. The second end 1305 includes a bone graft condenser head 1302. This configuration demonstrates an angle 1303 in the neck region 1304 located at a distance of about 3 mm to about 25 mm from the first end 1301.

Different angles 1303 can be used and different bone graft condensing angles and orientations can be used. For example, the angle 1303 of the neck can vary in range from about 75 to about 90 degrees. The diameter of the male attachment end 1206 can be the same as the female attachment on the handle, e.g., a diameter in a range from about 3 mm to about 8 mm.

The diameter can slightly decrease and taper toward the bone graft condensing end. The diameter of the bone grant condensing end 1205 can be in a range from about 2 mm to about 5 mm. The degree of taper can be from 2 degrees to 25 degrees.

The bone graft condenser head 1302 can attached to the neck at the same angle 1203 as neck or a different angle (not shown). The angle of the head can change and does not have to follow the same angle as the neck. The head does not have to attach to the neck in the middle of the condenser. It can also attach at the end of the condenser. The condenser head 1302 can also be rotated (turned) to the left or to the right. With an angled neck the rotated condenser head allows for different angles of condensing around the implant. The curvature diameter has been addressed in previous paragraphs and can vary in a range from about 2 mm to about 8 mm. The height, width, and length of the condenser head 1302 can be any height, width and length as described herein.

Figure 14:
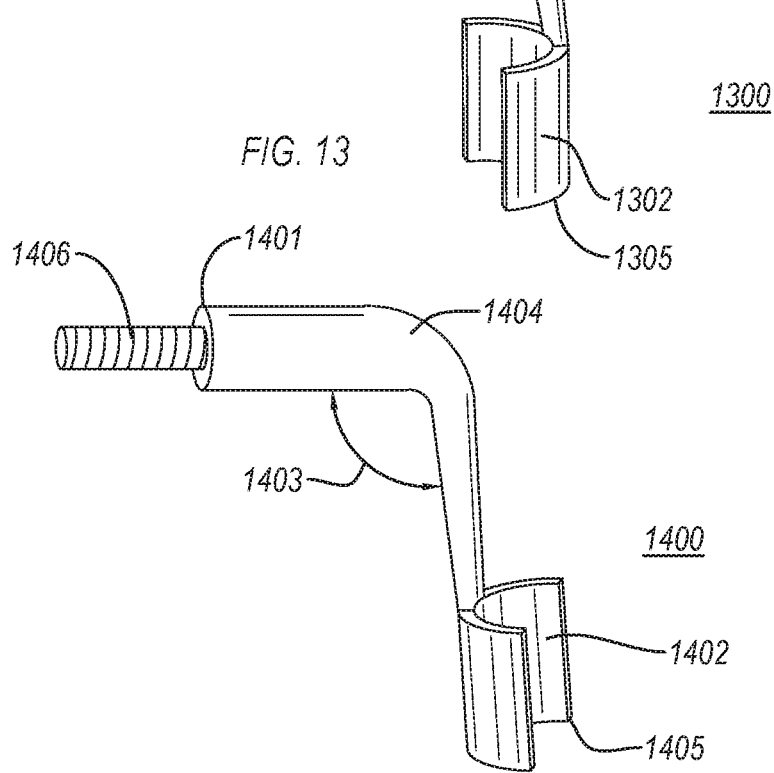
FIG. 14 illustrates an exemplary side view of a dental attachment according to an embodiment of the invention.

FIG. 14 illustrates an exemplary side view of a dental tool according to an embodiment of the invention.

Referring to FIG. 14, the dental tool 1400 illustrates a possible configuration of the bone graft condensing attachment. The dental tool 1400 includes a first end 1401, a second end 1405 and an attachment mechanism 1406. The second end 1405 includes a bone graft condenser head 1402. This configuration demonstrates an angle 1403 in the neck region 1404 located at a distance in a range from about 3 mm to about 25 mm from the first end 1401.

Different angles 1403 can be used and different bone graft condensing angles and orientations can be used. For example, the angle 1403 of the neck can vary from about 75 to about 90 degrees. The diameter of the male attachment end 1406 can be the same as the female attachment on the handle, e.g., a diameter in a range from about 3 mm to about 8 mm.

The diameter can slightly decrease and taper toward the bone graft condensing end. The diameter of the bone grant condensing end 1405 can be in a range from about 2 mm to about 5 mm or greater. The degree of taper can be in a range from about 2 degrees to about 25 degrees.

The bone graft condenser head 1402 can attached to the neck at the same angle 1403 as neck or a different angle (not shown). The angle of the head can change and does not have to follow the same angle as the neck. The head does not have to attach to the neck in the middle of the condenser. It can also attach at the end of the condenser. The condenser head 1402 can also be rotated (turned) to the left or to the right. With an angled neck the rotated condenser head allows for different angles of condensing around the implant. The curvature diameter has been addressed in previous paragraphs and can vary in a range from about 2 mm to about 8 mm. The height, width, and length of the condenser head 1202 can be any height, width and length as described herein.

Figure 15:
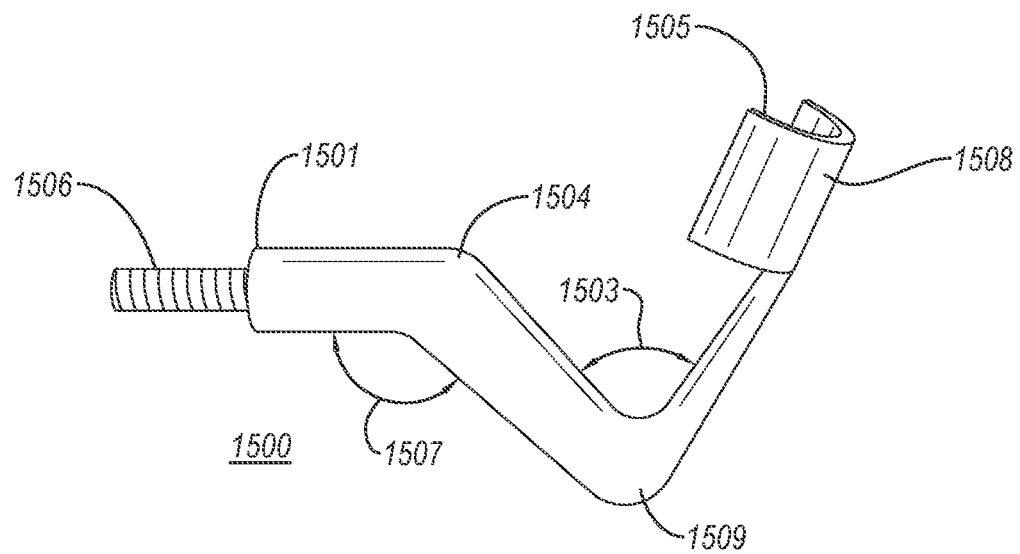
FIG. 15 illustrates an exemplary side view of a dental attachment according to an embodiment of the invention.

FIG. 15 illustrates an exemplary side view of a dental attachment according to an embodiment of the invention.

Referring to FIG. 15, the dental attachment 1500 illustrates a possible configuration of the bone graft condensing attachment. The dental attachment 1500 includes a first end 1501, a second end 1505 and an attachment mechanism 1506. The second end 1505 includes a bone graft condenser head 1508. There are two bends in this configuration, a first bend at first bend region 1504 and a second bend at second bend region 1509. The first bend region 1504 has an angle 1507 in a range from about 25 degrees to about 65 degrees. The second bend region 1509 has an angle 1503 in a range from about 75 degrees to about 125 degrees.

Different angles 1503 and 1507 can be used and different bone graft condensing angles and orientations can be used. The diameter of the male attachment end 1502 can be the same as the female attachment on the handle, e.g., a diameter in a range from about 3 mm to about 8 mm. The diameter can slightly decrease and taper toward the bone graft condensing end. The diameter of the bone grant condensing end 1505 can be in a range from about 2 mm to about 5 mm. The degree of taper can be in a range from 2 degrees to 25 degrees.

The bone graft condenser head 1508 can attach to the neck at the same angle 1503 as neck or a different angle (not shown). The angle of the head can change and does not have to follow the same angle as the neck. The head 1508 does not have to attach to the neck 1508 in the middle of the condenser. It can also attach at the end of the condenser. The condenser head 1508 can also be rotated (turned) to the left or to the right. With an angled neck the rotated condenser head allows for different angles of condensing around the implant. The curvature diameter has been addressed in previous paragraphs and can vary in range from about 2 mm to about 8 mm. The height, width, and length of the condenser head 1202 can be any height, width and length as described herein.

Figure 16:
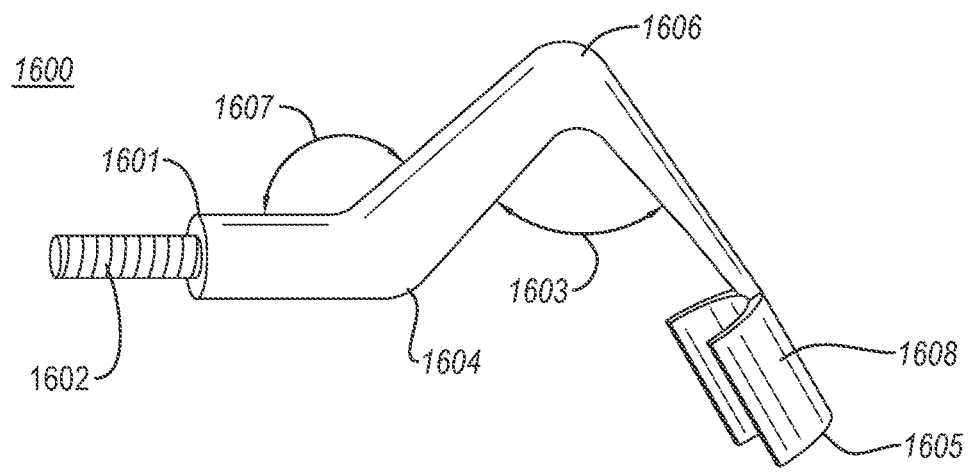
FIG. 16 illustrates an exemplary side view of a dental attachment according to an embodiment of the invention.

FIG. 16 illustrates an exemplary side view of a dental attachment according to an embodiment of the invention.

Referring to FIG. 16, the dental attachment 1600 illustrates a possible configuration of the bone graft condensing attachment. The dental attachment 1600 includes a first end 1601, a second end 1605 and an attachment mechanism 1602. The second end 1605 includes a bone graft condenser head 1608. There are two bends in this configuration, a first bend at first bend region 1604 and a second bend at second bend region 1606. The first bend region 1604 has an angle 1607 in a range from about 95 degrees to about 160 degrees. The second bend region 1606 has an angle 1603 in a range from about 10 degrees to about 85 degrees.

Different angles 1607 and 1603 can be used and different bone graft condensing angles and orientations can be used. The diameter of the male attachment end 1606 can be the same as the female attachment on the handle, e.g., a diameter in a range from about 3 mm to about 8 mm. The diameter can slightly decrease and taper toward the bone graft condensing end. The diameter of the bone grant condensing end 1605 can be in a range from about 2 mm to about 5 mm or greater. The degree of taper can be in a range from 2 degrees to 25 degrees or greater.

The bone graft condenser head 1608 can attach to the neck at the same angle as neck or a different angle (not shown). The angle of the head can change and does not have to follow the same angle as the neck. The head 1608 does not have to attach to the neck in the middle of the condenser. It can also attach at the end of the condenser. The condenser head 1608 can also be rotated (turned) to the left or to the right. With an angled neck the rotated condenser head allows for different angles of condensing around the implant. The curvature diameter has been addressed in previous paragraphs and can vary in range from about 2 mm to about 8 mm. The height, width, and length of the condenser head 1608 can be any height, width and length as described herein.

FIG. 17 illustrates an exemplary side view of a dental attachment according to an embodiment of the invention.

Referring to FIG. 17, the dental tool 1700 illustrates a possible configuration of the bone graft condensing attachment. The dental tool 1700 includes a first end 1703, a second end 1705 and an attachment mechanism 1702. The second end 1705 includes a bone graft condenser head 1704.

The attachment mechanism 1702 can include any attachment means described herein, e.g., a male threaded end. The second end 1707 is configured as a peri-implant bone condenser 1704 having a condensing end 1707 any width in any range described herein. The width of the condensing end 1707 can also taper from middle to ends and going from wider in the middle of the condenser and thinning as it goes to the ends of the condenser. The length from the first end 1703 to the second end 1705 can be a in a range from about 3 mm to about 30 mm or greater.

Bone graft condensing area 1709 is used for carrying the bone graft from the bone graft container in the workspace in the operatory to the area in the mouth where the implant that has been placed. The condensing area 1709 is configured to have a curvature diameter of the implant to adequately clear the implant during the condensing procedure. The bone graft condensing area 1709 transitions into the connection end 1702 of the bone condenser which is inserted and screwed into the handle of the instrument (not shown). It will be a smooth transition from a spoon area to the attachment area.

The condensing area 1709 is configured as a half circle shape condenser head. The length 1711 is dependent on diameter of the implant and a length for the half circle could be in a range from about 3 mm to about 12 mm or greater. The height 1713 of the instrument can vary in a range from about 2 mm to about 10 mm or greater. The curvature of the head is determined by the diameter of the implant. The condenser can have a diameter in a range from about 2 mm to about 9 mm or greater or any range therebetween. These measurements are configured to allow the instrument 1700 to be used for all different brands and companies of implants. Each company has different diameters and these measurements should be useful for all brands and companies. The illustration represents a flat condensing surface 1707 but different surface textures and shapes could be used, as referenced with FIGS. 7A, 7B, and 7C.

FIG. 18 illustrates an exemplary side view of a dental attachment according to an embodiment of the invention.

Referring to FIG. 18, the dental attachment 1800 illustrates a possible configuration of the bone graft condensing attachment. The dental tool 1800 includes a first end 1803, a second end 1805 and an attachment mechanism 1802. The second end 1805 includes a bone graft condenser head, having a bone condensing end 1807 and another end region 1809.

The attachment mechanism 1802 can include any attachment means described herein, e.g., a male threaded end. The condensing end 1807 is configured as a peri-implant bone condenser having a condensing end 1807 with a width in a range described herein. The width of the condensing end 1807 can also taper from middle to ends and going from wider in the middle of the condenser and thinning as it goes to the ends of the condenser. The length from the first end 1803 to the second end 1805 can be a in a range from about 3 mm to about 30 mm or greater.

Bone graft condensing area 1804 is used for carrying the bone graft from the bone graft container in the workspace in the operatory to the area in the mouth where the implant that has been placed. The condensing area 1804 is configured to have a curvature diameter of the implant to adequately clear the implant during the condensing procedure. The bone graft condensing area 1804 transitions into the connection end 1802 of the bone condenser which is inserted and screwed into the handle of the instrument (not shown). It will be a smooth transition from a spoon area to the attachment area.

The condensing area 1804 is configured as a quarter circle shape condenser head. The length 1811 is dependent on diameter of the implant. The general length 1811 for the half circle can be in be from about 4 mm to about 12 mm or greater.

The height 1813 of the instrument can vary from about 2 mm to about 10 mm or greater. The curvature of the head is determined by the diameter of the implant. The condenser can have a diameter in range from about 2 mm to about 9 mm or greater. These measurements are configured to allow the instrument to be used for all different brands and companies of implants. Each company has different diameters and these measurements should be useful for all brands and companies. The illustration represents a flat condensing surface 1807 but different surface textures and shapes could be used, as referenced with FIGS. 7A, 7B, and 7C.

FIG. 19 illustrates an exemplary side view of a dental attachment according to an embodiment of the invention.

Referring to FIG. 19, the dental attachment 1900 illustrates a possible configuration of the bone graft condensing attachment. The dental tool 1900 includes a first end 1903, a second end 1905 and an attachment mechanism 1902. The second end 1905 includes a bone graft condenser head, having a bone condensing end 1907 and another end region 1904.

The attachment mechanism 1902 can include any attachment means described herein, e.g., a male threaded end. The second end 1905 is configured as a peri-implant bone condenser having a condensing end 1907 with a width in a range described herein. The width of the condensing end 1907 can also taper from middle to ends and going from wider in the middle of the condenser and thinning as it goes to the ends of the condenser. The length from the first end 1903 to the second end 1905 can be a in a range from about 3 mm to about 30 mm or greater.

Bone graft condensing area 1909 is used for carrying the bone graft from the bone graft container in the workspace in the operatory to the area in the mouth where the implant that has been placed. The condensing area 1909 is configured to have a curvature diameter of the implant to adequately clear the implant during the condensing procedure. The diameter can be any diameter described herein. The bone graft condensing area 1909 transitions into the connection end 1902 of the bone condenser which is inserted and screwed into the handle of the instrument (not shown). It will be a smooth transition from a spoon area to the attachment area.

The condensing area 1909 is configured as an eighth circle shape condenser head. The length 1911 is dependent on diameter of the implant. The general length 1911 for the eighth circle could be from about 3 mm to about 12 mm or greater.

The height 1913 of the instrument can vary in a range from about 2 mm to about 10 mm or greater. The curvature of the head is determined by the diameter of the implant. The condenser can have a diameter in range from about 2 mm to about 9 mm or greater. These measurements are configured to allow the instrument to be used for all different brands and companies of implants. Each company has different diameters and these measurements should be useful for all brands and companies. The illustration represents a flat condensing surface 1907 but different surface textures and shapes could be used, as referenced with FIGS. 7A, 7B, and 7C.

FIG. 20 illustrates an exemplary side view of a dental attachment according to an embodiment of the invention.

Referring to FIG. 20, the dental tool 2000 illustrates a possible configuration of the bone graft condensing attachment. The dental tool 2000 includes a first end 2003, a second end 2005 and an attachment mechanism 2004. The second end 2005 includes a bone graft condenser head, having a bone condensing end 2007 and another end region 2002.

The attachment mechanism 2002 can include any attachment means described herein, e.g., a male threaded end. The second end 2005 is configured as a peri-implant bone condenser having a condensing end 2007 with any width in ranges described herein. The width of the condensing end 2007 can also taper from middle to ends and going from wider in the middle of the condenser and thinning as it goes to the ends of the condenser. The length from the first end 2003 to the second end 2005 can be in a range from about 3 mm to about 30 mm or greater.

Bone graft condensing area 2009 is used for carrying the bone graft from the bone graft container in the workspace in the operatory to the area in the mouth where the implant that has been placed. The condensing area 2009 is configured to have a curvature diameter of the implant to adequately clear the implant during the condensing procedure. The diameter can be any range diameter described herein. The bone graft condensing area 2009 transitions into the attachment mechanism 2004 of the bone condenser which is inserted and screwed into the handle of the instrument (not shown). It will be a smooth transition from a spoon area to the attachment area.

The condensing area 2009 is configured as a full circle shape condenser head. The length 2011 is dependent on diameter of the implant. The general length 2011 for the full circle can be in a range from about 4 mm to about 12 mm.

The height 2013 of the instrument can vary in a range from about 2 mm to about 10 mm. The curvature of the head is determined by the diameter of the implant. The condenser can have a diameter in a range from about 2 mm to about 9 mm or larger. These measurements are configured to allow the instrument to be used for all different brands and companies of implants. Each company has different diameters and these measurements should be useful for all brands and companies. The illustration represents a flat condensing surface 2007 but different surface textures and shapes could be used, as referenced with FIGS. 7A, 7B, and 7C.

Figure 21:
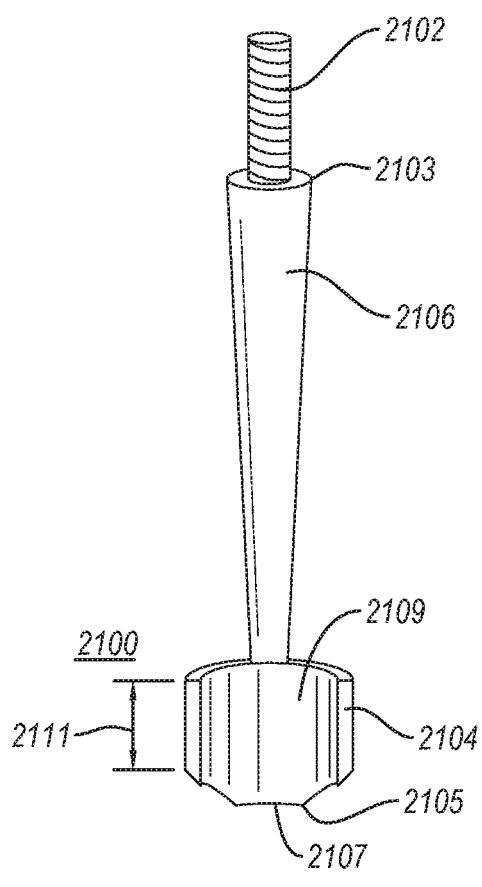
FIG. 21 illustrates an exemplary side view of a dental attachment according to an embodiment of the invention.
Figure 22:
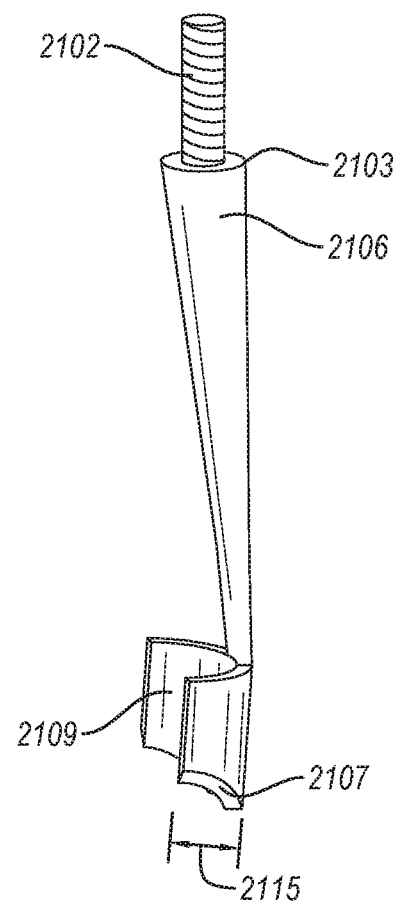
FIG. 22 illustrates an exemplary side view of a dental attachment according to an embodiment of the invention.

FIG. 21 illustrates an exemplary side view of a dental attachment according to an embodiment of the invention. FIG. 22 illustrates an exemplary side view of the dental tool according to FIG. 21.

Referring to FIGS. 21-22, the dental attachment illustrates a possible configuration of the bone graft condensing attachment. The dental tool 2100 includes a first end 2103, a second end 2105 and an attachment mechanism 2102. The second end 2105 includes a bone graft condenser head, having a bone condensing end 2107 and another end region 2104.

The attachment mechanism 2102 can include any attachment means described herein, e.g., a male threaded end. The second end 2105 is configured as a peri-implant bone condenser having a condensing end 2107 with a width in any range described herein. The width of the condensing end 2107 can also taper from middle to ends and going from wider in the middle of the condenser and thinning as it goes to the ends of the condenser. The length 2106 from the first end 2103 to the second end 2105 can be a in a range from about 3 mm to about 30 mm or greater.

Bone graft condensing area 2109 is used for carrying the bone graft from the bone graft container in the workspace in the operatory to the area in the mouth where the implant that has been placed. The condensing area 2109 is configured to have a curvature diameter of the implant to adequately clear the implant during the condensing procedure. The diameter can be any diameter size described herein. The bone graft condensing area 2109 transitions into the attachment mechanism 2102 of the bone condenser which is inserted and screwed into the handle of the instrument (not shown). It will be a smooth transition from a spoon area to the attachment area.

The condensing area 2109 is configured about a quarter circle shape condenser head. The length 2111 is dependent on diameter of the implant. The general length 2111 for the quarter circle can be in a range from about 4 mm to about 12 mm.

The height 2115 of the instrument can vary in a range from about 2 mm to about 10 mm or greater. The curvature of the head is determined by the diameter of the implant. The condenser can have a diameter in a range from about 2 mm to about 9 mm or greater. These measurements are configured to allow the instrument to be used for all different brands and companies of implants. Each company has different diameters and these measurements should be useful for all brands and companies. The illustration represents a flat condensing surface 2107 but different surface textures and shapes could be used, as referenced with FIGS. 7A, 7B, and 7C. The condensing head and condensing surface are not limited to the modifications specifically illustrated. The modifications can also be used for other sizes of the condensing head, i.e., quarter circle condensing head, eighth circle condensing head and so on as previously described herein. In the illustration, the change of angle in the condensing surface is a sharp corner; the corners can be of different shapes, smooth, round, square, concave, convex, etc. and are not limited to what is illustrated.

Figure 23:
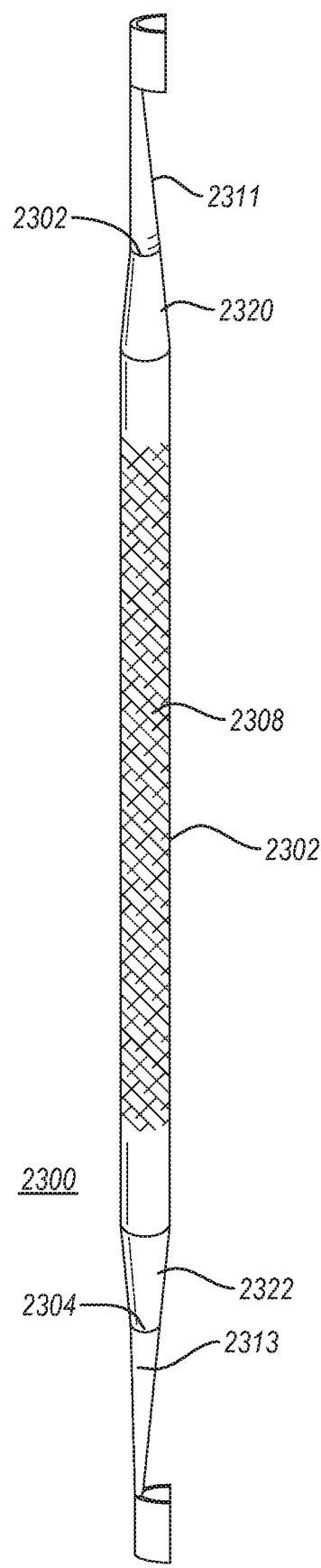
FIG. 23 illustrates an exemplary perspective view of a dental instrument with an attached first and second dental tool according to an embodiment of the invention.

FIG. 23 illustrates an exemplary perspective view of a dental instrument with attached first and second dental attachments according to an embodiment of the invention.

Referring to FIGS. 23, the dental instrument is generally represented with reference to number 2300 including a first end 2302, an opposite spaced apart second end 2304, and a handle 2306. The handle 2306 includes a textured region 2308 that provides for enhanced safety by preventing or substantially preventing slipping or movement of a user's hand during use of the dental instrument 2300. The second end 2304 has an open end (not shown) and the first end 2302 (not shown) has an open end.

The textured region 2308 can include any type of texture, e.g., texture arranged directly into the surface of the textured region 2308, a separate layer on the surface of the handle 2306, a coating on the handle 2306 where the coating has a texture or any combination of the same. The texture 2308 in the texture region 2308 can include any geometry pattern of texture, e.g., circle pattern, square pattern, honeycomb pattern, crisscross pattern, line pattern, combinations of the same or the like. Optionally and/or alternatively, the textured region can include an anti-slip coating, anti-slip tape or combinations of the same. Optionally and/or alternatively, the textured region or dental instrument can include an anti-bacterial coating, anti-fungal coating, or the like. Optionally and/or alternatively, the instrument can be any color or combination of colors.

The first end 2302 has an attachment mechanism (not shown) in a channel or lumen of the opening as described herein. The second end 2304 has an attachment mechanism (not shown) in a channel or lumen of the opening as described herein. In this embodiment, a first attachment device 2311 and second attachment device 2313. More specifically, the first attachment device 2311 and second attachment device 2313 is releasably attached to the tool handle 2306. Optionally and/or alternatively, the attachment devices 2311 and 2313 are integral with the dental instrument 2300 as one-piece or not releasably attached, but permanently attached. The dental tool 2300 can be constructed from surgical stainless steel or any other material or combination of material described herein. The handle can have a width in a range from about 3 mm to about 12 mm and a length in a range from about 5 cm to about 20 cm or greater.

The tapered connection section 2320 and 2322 allows for ease of use of instrument by decreasing circumference for better clearance in areas of use. Taper section 2320 and 2322 can have a length in a range from about 5 mm to about 30 mm or greater. The degree of taper can vary from about 5 degrees to about 40 degrees. The diameter of the insertion end is in a range between about 3 mm to about 8 mm. Any attachment device as described herein can be utilized on the first or second end.

The material of the attachment device 2311 and 2313 can be one of titanium, plastic, thermoplastic, metal, alloy, or any combination or other acceptable material. The length of the taper region 2312 and 2313 can vary from the first end 2302 to the second end 2304, e.g., from about 2 cm to about 4 cm or greater. The attachment devices described herein can be used as peri-implant bone graft condensers can be manufactured and sold as single instruments or as a developed set of instruments with varying head and neck configurations.

Optionally and/or alternatively, the attachment devices of the instruments can be sold with a container, e.g., a surgical cassette that protects and organizes the instruments. The cassette can also facilitate the sterilization of the instruments and attachments. That is, the cassette and instrument and attachment devices can be sterilized as a single unit. The cassette can be made of surgical stainless steel with perforations to meet the requirements for surgical instruments. The cassette can a single or multiple hinges that connects the two cassette components, e.g., a male and female end that slide together. The cassette will close with a simple closing mechanism that allows the cassette to be handled or transported without the cassette opening. The cassette will have a rubber substance that will hold the instruments in place and not allow them to move during transport. The instrument will be held in place by pressure from the thermoplastic material. The material may be slightly comprehensible. The material is configured to withstand normal use and the temperatures and pressures of sterilization.

FIG. 24A illustrates an exemplary end view of a dental attachment according to an embodiment of the invention. FIG. 24B illustrates an exemplary end view of a dental attachment according to an embodiment of the invention. FIG. 24C illustrates an exemplary end view of a dental attachment according to an embodiment of the invention. FIG. 24D illustrates an exemplary end view of a dental attachment according to an embodiment of the invention.

Referring to 24A-24D, four different attachment devices are shown with reference to numbers 2402, 2404, 2406, and 2408, respectively. The angle 2412, angle 2414, angle 2416 and angle 2418 is about 90 degrees. However, other angles may be used, e.g., angles in a range from about 45 degrees to about 135 degrees.

Referring to FIG. 24A, the tip 2420 from the end configuration has a 90 degree arc with a first end point, a middle point, a second end point. The thickness 2422 is about 1 mm and measured at a middle point of the arc.

Referring to FIG. 24B, the tip 2423 from the end configuration has a 90 degree arc with a first end point, a middle point, a second end point. The thickness 2424 is about 1.5 mm measured at a middle point of the arc.

Referring to FIG. 24C, the tip 2425 from the end configuration has a 90 degree arc with a first end point, a middle point, a second end point. The thickness 2426 is about 2 mm measured at a middle point of the arc.

Referring to FIG. 24D, the tip 2427 from the end configuration has a 90 degree arc with a first end point, a middle point, a second end point. The thickness 2428 is about 2.5 mm measured at a middle point of the arc.

FIG. 24E illustrates an exemplary end view of a dental attachment according to an embodiment of the invention. FIG. 24F illustrates an exemplary end view of a dental attachment according to an embodiment of the invention. FIG. 24G illustrates an exemplary end view of a dental attachment according to an embodiment of the invention. FIG. 24H illustrates an exemplary end view of a dental attachment according to an embodiment of the invention.

Referring to 24E-24H, four different attachment devices represented with reference to numbers 2432, 2434, 2436, and 2438, respectively. The angle 2440, angle 2442, angle 2444, and angle 2446 is about 90 degrees. However, other angles may be used, e.g., angles in a range from about 45 degrees to about 135 degrees.

Referring to FIG. 24E, the tip 2448 from the end configuration has a 120 degree arc with a first end point, a middle point, a second end point. The thickness 2456 is about 1 mm measured at a middle point of the arc.

Referring to FIG. 24F, the tip 2450 from the end configuration has a 120 degree arc with a first end point, a middle point, a second end point. The thickness 2458 is about 1.5 mm measured at a middle point of the arc.

Referring to FIG. 24G, the tip 2452 from the end configuration has a 120 degree arc with a first end point, a middle point, a second end point. The thickness 2460 is about 2 mm measured at a middle point of the arc.

Referring to FIG. 24H, the tip 2454 from the end configuration has a 120 degree arc with a first end point, a middle point, a second end point. The thickness 2462 is about 2.5 mm measured at a middle point of the arc.

Optionally and/or alternatively, other arc lengths from about 45 degree to about 180 degrees or greater can also be utilized. In addition, the thickness can be variable or constant (as shown) across the arc length from about 1 mm to about 3 mm or greater. The thickness allows a user to more readily compact bone graft or other material as described above.

FIG. 25A illustrates an exemplary end view of a dental attachment according to an embodiment of the invention. FIG. 25B illustrates an exemplary end view of a dental attachment according to an embodiment of the invention. FIG. 25C illustrates an exemplary end view of a dental attachment according to an embodiment of the invention. FIG. 25D illustrates an exemplary end view of a dental attachment according to an embodiment of the invention.

Referring to 25A-25D, four different attachment devices as 2502, 2504, 2506, and 2508, respectively. The angle on each attachment device is about 90 degrees. However, other angles may be used, e.g., angles in a range from about 45 degrees to about 135 degrees. Referring now to FIG. 25A, the tip 2510 from the end configuration has a 90 degree arc with a first end point, a middle point, a second end point. The thickness 2418 is about 1 mm measured at a middle point of the arc.

Referring to FIG. 25B, the tip 2512 from the end configuration has a 120 degree arc with a first end point, a middle point, a second end point. The thickness 2520 is about 1.5 mm measured at a middle point of the arc.

Referring to FIG. 25C, the tip 2514 from the end configuration has a 120 degree arc with a first end point, a middle point, a second end point. The thickness 2522 is about 2 mm measured at a middle point of the arc.

Referring to FIG. 25D, the tip 2516 from the end configuration has a 120 degree arc with a first end point, a middle point, a second end point. The thickness 2524 is about 2.5 mm measured at a middle point of the arc.

FIG. 25E illustrates an exemplary end view of a dental tool according to an embodiment of the invention. FIG. 25F illustrates an exemplary end view of a dental tool according to an embodiment of the invention. FIG. 25G illustrates an exemplary end view of a dental tool according to an embodiment of the invention. FIG. 25H illustrates an exemplary end view of a dental tool according to an embodiment of the invention.

Referring to 25E-25H, four different attachment devices as 2526, 2528, 2530, and 2532, respectively. The angle on each attachment device is about 90 degrees. However, other angles may be used, e.g., angles in a range from about 45 degrees to about 135 degrees.

Referring now to FIG. 25E, the tip 2534 from the end configuration has a 120 degree arc with a first end point, a middle point, a second end point. The thickness 2542 is about 1 mm measured at a middle point of the arc.

Referring to FIG. 25F, the tip 2544 from the end configuration has a 120 degree arc with a first end point, a middle point, a second end point. The thickness 2536 is about 1.5 mm measured at a middle point of the arc.

Referring to FIG. 25G, the tip 2538 from the end configuration has a 120 degree arc with a first end point, a middle point, a second end point. The thickness 2546 is about 2 mm measured at a middle point of the arc Referring to FIG. 25H, the tip 2540 from the end configuration has a 120 degree arc with a first end point, a middle point, a second end point. The thickness 2548 is about 2.5 mm measured at a middle point of the arc.

Optionally and/or alternatively, other arc lengths from about 45 degree to about 180 degrees or greater can also be utilized. In addition, the thickness can be variable or constant (as shown) across the arc length from about 1 mm to about 3 mm or greater. The thickness allows a user to more readily compact bone graft or other material as described above.

Figure 26:
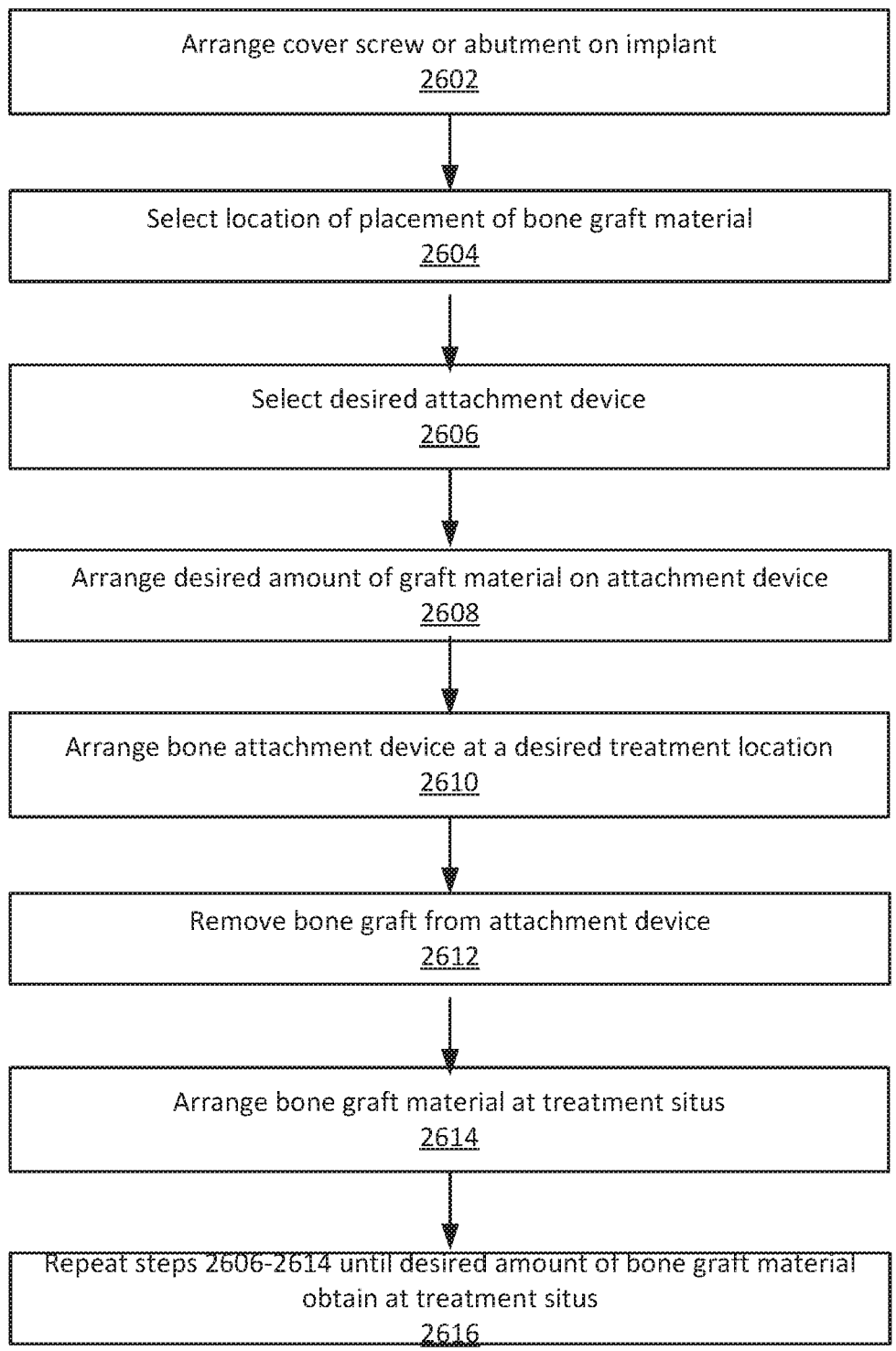
FIG. 26 illustrates an exemplary method of using on for the dental instruments or attachment devices described in FIGS. 1-25H.

FIG. 26 illustrates an exemplary method of using on for the dental instruments or attachment devices described in FIGS. 1-25H.

Referring to FIG. 26, in one embodiment, the use of any of the implementations or embodiments described herein is now discussed. For example, the devices or implementations as described herein can be used with the immediate implant placement technique into an extraction site. By way of example, the steps of using this instrument can begin after the tooth has been extracted, the osteotomy has been shaped and developed, and the implant placement has been completed into the extraction site.

Any of the dental instruments and attachment devices described herein in FIGS. 1-25H can be used as a dual-purpose instrument, e.g., used as a bone graft carrier and as a bone graft condenser. These instructions will explain how to use a separate bone graft carrier during the procedure.

The bone graft use instructions and preparations will not be covered in these procedures. Those preparations are to be determined by the operator. These methods are directed to using the instruments herein with various attachment devices described herein.

It may be necessary to have a cover screw, placement abutment, or some type of abutment to cover the internal components of the dental implant while placing bone graft material around the implant. A cover screw would be the component of choice but that decision is up to the operator. The type of bone graft material used is to be determined by the operator.

In a preferred embodiment, the user will not allow the bone grafting instrument to contact the implant during this procedure to ensure no damage occurs to the implant surface. However, the instruments have been manufactured using materials that are approved to contact implant surfaces.

Step 2602:
Place desired cover screw or abutment onto the implant.
Step 2604:
Choose the location around the implant where the bone graft material is going to be placed.
Step 2606:
Choose the desired shape and size of attachment device to be used, e.g., a condenser. The shape and size of condenser to be used is determined based on one or more of characteristics of the implant, e.g., diameter implant placed into the extraction site, the shape (length and width and curvature) of the open space between the implant and the natural alveolar bone, the desired shape of the contact end of the bone graft condenser (round, flat, or concave) and the desired location of bone graft material placement (mesial, distal, buccal, lingual, palatal). When using the adaptor model, loosen the adjustable head and change to the desired orientation and tighten.
Step 2608:
Obtain the desired amount of graft material with one of the attachment devices. For example, scoop a desired predetermined amount of bone graft material onto bone graft carrier.
Step 2610:
Place the end of the attachment device, e.g., bone graft carrier, at desired location and angle around the implant. Allow space between the implant and the end of the bone graft carrier for proper bone graft placement.
Step 2612:
Use the pen-implant bone graft condenser to slide bone graft material off the bone graft carrier and into the open space between the implant and the natural alveolar bone.
Step 2614:
Use condensing end of the pen-implant bone graft condenser to push bone graft material apically into the extraction site between the implant and the natural alveolar bone to desired depth.

A smaller and narrower pen-implant bone graft condenser can be used to gently condense the bone at the most apical area of the open space between the implant and the natural alveolar bone. A larger and wider pen-implant bone graft condenser can be used to condense the bone graft material around the top portion of the implant.
Step 2616:
After initial bone graft material has been placed and condensed as desired, repeat steps 1-5 as many times as needed until the bone graft material has been placed to the desired height at all locations around the implant.

To avoid unnecessarily obscuring the present disclosure, the preceding description may omit a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Also, while the various steps of using have been disclosed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

The present disclosure, in various aspects, embodiments, and/or configurations, includes components, methods, processes, systems and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The inventions and methods described herein can be viewed as a whole, or as a number of separate inventions, that can be used independently or mixed and matched as desired. All inventions, steps, processed, devices, and methods described herein can be mixed and matched as desired. All previously described features, functions, or inventions described herein or by reference may be mixed and matched as desired.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of performing a dental procedure, comprising:
    obtaining a dental instrument comprising a first end and a second end spaced apart from the first end;
    obtaining an attachment device comprising a first end, a second end, and a condensing area arranged between the first end and the second end of the attachment device having a shovel region configured to receive a bone graft material, wherein the second end of the attachment device has a condensing region having a thickness in a range from 1 mm to 3 mm and the attachment device comprises a height in a range from 2 mm to 15 mm, a length in a range from 3 mm to 5 cm and a width in a range from 2 mm to 15 mm;
    obtaining a dental implant;
    arranging the dental implant at a treatment situs;
    attaching the attachment device to the first end of the dental instrument;
    obtaining a predetermined amount of a bone graft material on the shovel region of the attachment device; and
    arranging a desired amount of the bone graft material at the treatment situs around at least a portion of the dental implant.

2. The method of claim 1, wherein the dental instrument further comprises a textured region of at least a portion of the dental instrument.

3. The method of claim 2, wherein the dental instrument comprises at least a portion comprising a stainless steel material.

4. The method of claim 1, further comprising:
    condensing the bone graft material with an end of the condensing region of the attachment device.

5. The method of claim 1, further comprising:
    removing the attachment device from the first end of the dental instrument; and
    attaching a different attachment device to the first end of the dental instrument.

6. The method of claim 1, further comprising:
    obtaining a predetermined amount of a second bone graft material on the shovel region of a different attachment device; and
    arranging a desired amount of the second bone graft material at the treatment situs around at least a portion of the dental implant.

7. The method of claim 1, wherein the condensing region comprises one of a concave shape, a convex shape and flat shape.

8. A method of performing a dental procedure, comprising:
    obtaining a dental instrument comprising a first end and a second end spaced apart from the first end;
    obtaining an attachment device comprising a first end, a second end, and a condensing area arranged between the first end and the second end of the attachment device having a shovel region for receiving bone graft material, wherein the second end of the attachment device has a condensing region having a thickness in a range from 1 mm to 3 mm;
    obtaining a dental implant;
    arranging the dental implant at a treatment situs;
    attaching the attachment device to the first end of the dental instrument;
    obtaining a predetermined amount of a bone graft material on the shovel region of the attachment device;
    arranging a desired amount of the bone graft material at the treatment situs around at least a portion of the dental implant;
    obtaining a predetermined amount of a second bone graft material on the shovel region of a different attachment device; and
    arranging a desired amount of the second bone graft material at the treatment situs around at least a portion of the dental implant.

9. The method of claim 8, wherein the dental instrument further comprises a textured region arranged at least partially between the first end and the second end.

10. The method of claim 9, wherein the dental instrument comprises a stainless steel material.

11. The method of claim 8, further comprising:
condensing the bone graft material with an end of the condensing region of the attachment device.

12. The method of claim 8, further comprising:
removing the attachment device from the first end of the dental instrument; and
attaching a different attachment device to the first end of the dental instrument.

13. The method of claim 8, wherein the condensing region comprises one of a concave shape, a convex shape and flat shape.

14. The method of claim 8, wherein the attachment device comprises a height in a range from 2 mm to 15 mm, a length in a range from 3 mm to 5 cm and a width in a range from 2 mm to 15 mm.

\* \* \* \* \*